United States Patent
Millott et al.

(10) Patent No.: US 6,772,074 B2
(45) Date of Patent: Aug. 3, 2004

(54) ADAPTATION PERFORMANCE IMPROVEMENTS FOR ACTIVE CONTROL OF SOUND OR VIBRATION

(75) Inventors: Thomas A. Millott, Milford, CT (US); Douglas G. MacMartin, San Gabriel, CA (US); Christopher G. Park, Willington, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/083,949

(22) Filed: Feb. 27, 2002

(65) Prior Publication Data

US 2002/0120415 A1 Aug. 29, 2002

Related U.S. Application Data

(60) Provisional application No. 60/271,470, filed on Feb. 27, 2001.

(51) Int. Cl.[7] .............................................. G01K 11/16
(52) U.S. Cl. .......................... 702/56; 700/280; 381/71.8
(58) Field of Search .......................... 702/56; 700/280; 244/1 N; 381/71.4, 71.11

(56) References Cited

U.S. PATENT DOCUMENTS

| | | | |
|---|---|---|---|
| 5,347,586 A | 9/1994 | Hill et al. | 381/71.8 |
| 5,526,292 A | 6/1996 | Hodgson et al. | 700/280 |
| 5,558,298 A | 9/1996 | Pla et al. | 244/1 N |
| 5,940,519 A | 8/1999 | Kuo | 381/71.11 |
| 6,138,947 A | 10/2000 | Welsh et al. | 244/1 N |

FOREIGN PATENT DOCUMENTS

| | | |
|---|---|---|
| JP | 53071759 | 6/1978 |
| JP | 2001020789 | 1/2001 |

OTHER PUBLICATIONS

Douglas E. Melton, R.A. Greiner, Adaptive Feedforward Multiple–input, Multiple–output Active Noise Control, 1993, pp. II–229–232.

(List continued on next page.)

Primary Examiner—Kamini Shah
(74) Attorney, Agent, or Firm—Carlson, Gaskey & Olds, P.C.

(57) ABSTRACT

A noise or vibration control system improves the quality of adaptation estimates by filtering the input signals to the adaptation, selectively implementing a "dead-zone" during which adaptation does not occur and by selectively adding a dither signal to the control commands. The dead-zone is based on the magnitude of the changes in the control commands, which are responding to the changes in the sensor signals. The dead-zone can be applied to all actuators simultaneously, or can be applied to the adaptation of each actuator channel independently. To maintain identifiability, a "dither signal" is added to the control commands to "ping" the system to increase the amount of information available to the adaptive algorithm. The dither signal is preferably implemented on only one actuator channel at a time. Also, the dither amplitude for each channel is preferably set to be proportional to the current control amplitude. The quality of the adaptation estimates is also improved by filtering the input signals to the adaptation circuit, $y_k = \Delta z_k$, and $v_k = \Delta u_k$. Among other things, the filter matches the filtering applied by the harmonic estimator.

22 Claims, 2 Drawing Sheets

OTHER PUBLICATIONS

MacMartin, Douglas G., Davis, Mark W., Yoerkie, Jr., Charles A., Welsh, William A., Helicopter Gear–Mesh ANC Concept Demon stration, United Technologies Research Center, East Hartford, CT and Sikorsky Aircraft Corporation, Stratford, CT, No Date.

Millott, Thomas A., Welsh, William A., Yoerkie, Jr., Charles A., MacMartin, Douglas G., Davis, Mark W., Flight Test of Active Gear–Mesh Noise Control on the S–76 Aircraft, United Technologies Research Center, East Hartford, CT and Sikorsky Aircraft Corporation, Stratford, CT, Presented at the American Helicopter Society 54th Ann ual Forum, Washington, D.C., May 20–22, 1998, American Helicopter Society, Inc.

Davis, Mark W., Refinement and Evaluati on of Helicopter Real–Time Self–Adaptive Active Vibration Controller Algorithms, NASA Contractor Report 3821, Aug. 1984.

ADAPTATION PERFORMANCE IMPROVEMENTS FOR ACTIVE CONTROL OF SOUND OR VIBRATION

This application claims priority to U.S. Provisional Application Ser. No. 60/271,470, Filed Feb. 27, 2001.

BACKGROUND OF THE INVENTION

1. Field of the Invention

This invention relates to optimal control of a system such as an active noise or vibration control system such as for a helicopter.

2. Background

An active control system consists of a number of sensors which measure the ambient variables of interest (e.g. sound or vibration), a number of actuators capable of generating an effect on these variables (e.g. by producing sound or vibration), and a computer which processes the information received from the sensors and sends commands to the actuators so as to reduce the amplitude of the sensor signals. The control algorithm is the scheme by which the decisions are made as to what commands to the actuators are appropriate.

For tonal control problems, the computation can be performed at an update rate lower than the sensor sampling rate as described in copending application entitled "Computationally Efficient Means for Active Control of Tonal Sound or Vibration". This approach involves demodulating the sensor signals so that the desired information is near DC (zero frequency), performing the control computation, and remodulating the control commands to obtain the desired output to the actuators. The control computations are therefore performed on the sine and cosine components at the frequency of interest for each sensor signal. These can be represented as a complex variable where the real part is equal to the cosine term, and the imaginary part is equal to the sine term.

The number of sensors is given by $n_s$ and the number of actuators is $n_a$. The complex harmonic estimator variables that are calculated from the measurements of noise or vibration level can be assembled into a vector of length $n_s$ denoted $z_k$ at each sample time k. The control commands generated by the control algorithm can likewise be assembled into a vector of length $n_a$ denoted $u_k$. The commands sent to the actuators are generated by multiplying the real and imaginary parts of this vector by the cosine and sine of the desired frequency.

In the narrow bandwidth required for control about each tone, the transfer function between actuators and sensors is roughly constant, and thus, the system can be modeled as a single quasi-steady complex transfer function matrix, denoted T. This matrix of dimension $n_s$ by $n_a$ describes the relationship between a change in control command and the resulting change in the harmonic estimate of the sensor measurements, that is, $\Delta z_k = T\Delta u_k$. For notational simplicity, define $y_k = \Delta z_k$, and $v_k = \Delta u_k$. The complex values of the elements of T are determined by the physical characteristics of the system (including actuator dynamics, the structure and/or acoustic cavity, and anti-aliasing and reconstruction filters) so that $T_{ij}$ is the response at the reference frequency of sensor i due to a unit command at the reference frequency on actuator j. Many algorithms may be used for making control decisions based on this model.

The control law is derived to minimize a quadratic performance index $$J = z^T W_z z + u^T W_u u + v^T W_{\delta u} v$$

where $W_z$, $W_u$ and $W_{\delta u}$ are diagonal weighting matrices on the sensor, control inputs, and rate of change of control inputs respectively. A larger control weighting on an actuator will result in a control solution with smaller amplitude for that actuator.

Solving for the control which minimizes J yields:

$$u_{k+1} = u_k - Y_k(W_u u_k + T_k^T W_z z_k)$$

where $$Y_k = (T_k^T W_z T_k + W_u + W_{\delta u})^{-1}$$

The matrix Y determines the rate of convergence of different directions in the control space, but does not affect the steady state solution. In the following equation, the step size multiplier $\beta < 1$ provides control over the convergence rate of the algorithm. A value of approximately $\beta = 0.1$ may be used, for example.

$$u_{k+1} = u_k - \beta Y_k(W_u u_k + T_k^H W_z z_k)$$

The performance of this control algorithm is strongly dependent on the accuracy of the estimate of the T matrix. When the values of the T matrix used in the controller do not accurately reflect the properties of the controlled system, controller performance can be greatly degraded, to the point in some cases of instability. An initial estimate for T can be obtained prior to starting the controller by applying commands to each actuator and looking at the response on each sensor. However, in many applications, the T matrix changes during operation. For example, in a helicopter, as the rotor rpm varies, the frequency of interest changes, and therefore the T matrix changes. For the gear-mesh frequencies, variations of 1 or 2% in the disturbance frequency can result in shifts through several structural or acoustic modes, yielding drastic phase and magnitude changes in the T matrix, and instability with any fixed-gain controller (i.e. if $T_{k+1} = T_k$ for all k). Other sources of variation in T include fuel burn-off, passenger movement, altitude and temperature induced changes in the speed of sound, etc.

There are several possible methods for performing on-line identification of the T matrix, including Kalman filtering, an LMS approach, and normalized LMS. For an estimated T matrix, $T^e$, an error vector can be formed as $$E = y - T^e v$$

The estimated T matrix is updated according to $$T^e_{k+1} = T^e_k + EK^T$$

The different estimation schemes differ in how the gain matrix K is selected. The Kalman filter gain K is based on the covariance of the error between T and the estimate $T^e$, given by the matrix P where $$M = P_k + Q$$

$$K = Mv/(R + v^T Mv)$$

$$P_{k+1} = M - Kv^T M$$

and the matrix Q is a diagonal matrix with the same dimension as the number of actuators, and typically with all diagonal elements equal. The scalar R can be set equal to one with no loss in generality provided that the matrices Q and R are constant in time. The normalized LMS approach is very similar, with the gain matrix K given by $$K=Qv/(1+v^TQv)$$

The algorithm can be used with the Kalman filter approach, or using the normalized LMS approach which is computationally simpler and may provide similar or better performance. The current invention is described in terms of this equation, however, the specific form of the adaptation algorithm is not crucial to the invention.

Any of these adaptation schemes will obtain excellent estimation of the T matrix when there is little noise in the measurements. As noise levels increase, however, there are difficulties as the filter can not distinguish between the effects of noise and the effects of actual changes in T. As a result, the adaptation parameters will tend to drift. Decreasing adaptation gain will decrease the drift but not prevent it, and will degrade the adaptation performance.

The algorithm as described above is self-adaptive in the sense that the plant (i.e., system) model used in the control update calculation is actively updated during closed-loop operation based on changes in the sensor signals resulting from the application of the changes in the actuator commands determined by the control update calculation. However, during steady-state conditions, when changes in the control commands are responding only to "noise" in the estimate of the disturbance being canceled, there is a loss of identifiability of the plant. This loss of identifiability is a result of coupling the control update calculation and the adaptation update calculation together. The adaptation process is estimating the system by observing how changes in actuator commands cause changes in the measured system response; however, due to the control process, the change in control Δu is not independent from the change in measurement Δz. This coupling results in an instability or drift observed in steady state that can be severe if signal-to-noise is poor.

In addition to causing drift behavior, as described above, noise also degrades the quality of the adaptation estimate through two related mechanisms. First, because the signal to noise ratio is reduced the adaptation estimate will include a random noise component. The second effect is more subtle. The adaptation is intended to estimate the transfer function from actuators to sensors at the disturbance frequency. It is reasonable to assume that the physical transfer function does not vary substantially over the bandwidth of the control. Control transients are close to the disturbance frequency, and therefore the transfer functions due to these input signals are close to the desired transfer function. However, the adaptation will also respond to noise on $y_k$ and $v_k$ that is at higher frequencies (in the demodulated system, i.e. further away from the desired frequency). Changes in the physical system at these frequencies are unknown, however, the most significant change is due to the harmonic estimation filter on $y_k$, the effect of which is known. The estimation of the harmonic components of the sensor signals at the desired frequency requires low-pass filtering to avoid aliasing in downsampling the estimates. While there is no reduction in the amplitude of the sensor information $y_k$ in the immediate vicinity of the desired frequency, $y_k$ is attenuated at frequencies further form the desired frequency, while $v_k$ is not. The algorithm described above will therefore under-predict the desired transfer function because it will average over frequency, and include part of the reduction in amplitude of the harmonic estimator filter. There will be no bias in phase since the noise for positive frequencies should be comparable to the noise for negative frequencies, and the phase effects will therefore cancel.

SUMMARY OF THE INVENTION

The present invention improves the quality of the adaptation estimates by filtering the input signals to the adaptation, selectively implementing a "dead-zone" during which adaptation does not occur and by selectively adding a dither signal to the control commands. In the present invention, the dead-zone is based on the magnitude of the changes in the control commands, which are responding to the changes in the sensor signals. The dead-zone can be applied to all actuators simultaneously, or can be applied to the adaptation of each actuator channel independently. The appropriate threshold for the dead-zone can be updated on-line.

To maintain identifiability, a "dither signal" is added to the control commands to "ping" the system to increase the amount of information available to the adaptive algorithm. The dither signal is preferably implemented on only one actuator channel at a time. Further, it is preferred that triangular dither is implemented such that the control amplitude of the channel being dithered is ramped down and then ramped back up to its initial value in a predetermined number of steps. Also, the dither amplitude for each channel is preferably set to be proportional to the current control amplitude.

This invention will also improve the quality of the adaptation estimates by filtering the input signals to the adaptation circuit, $y_k=\Delta z_k$, and $v_k=\Delta u_k$. Among other things, the filter matches the filtering applied by the harmonic estimator.

DETAILED DESCRIPTION

Control systems consist of a number of sensors which measure ambient vibration (or sound), actuators capable of generating vibration at the sensor locations, and a computer which processes information received from the sensors and sends commands to the actuators which generate a vibration field to cancel ambient vibration (generated, for example by a disturbing force at the helicopter rotor). The control algorithm is the scheme by which the decisions are made as to what the appropriate commands to the actuators are.

Figure 1:
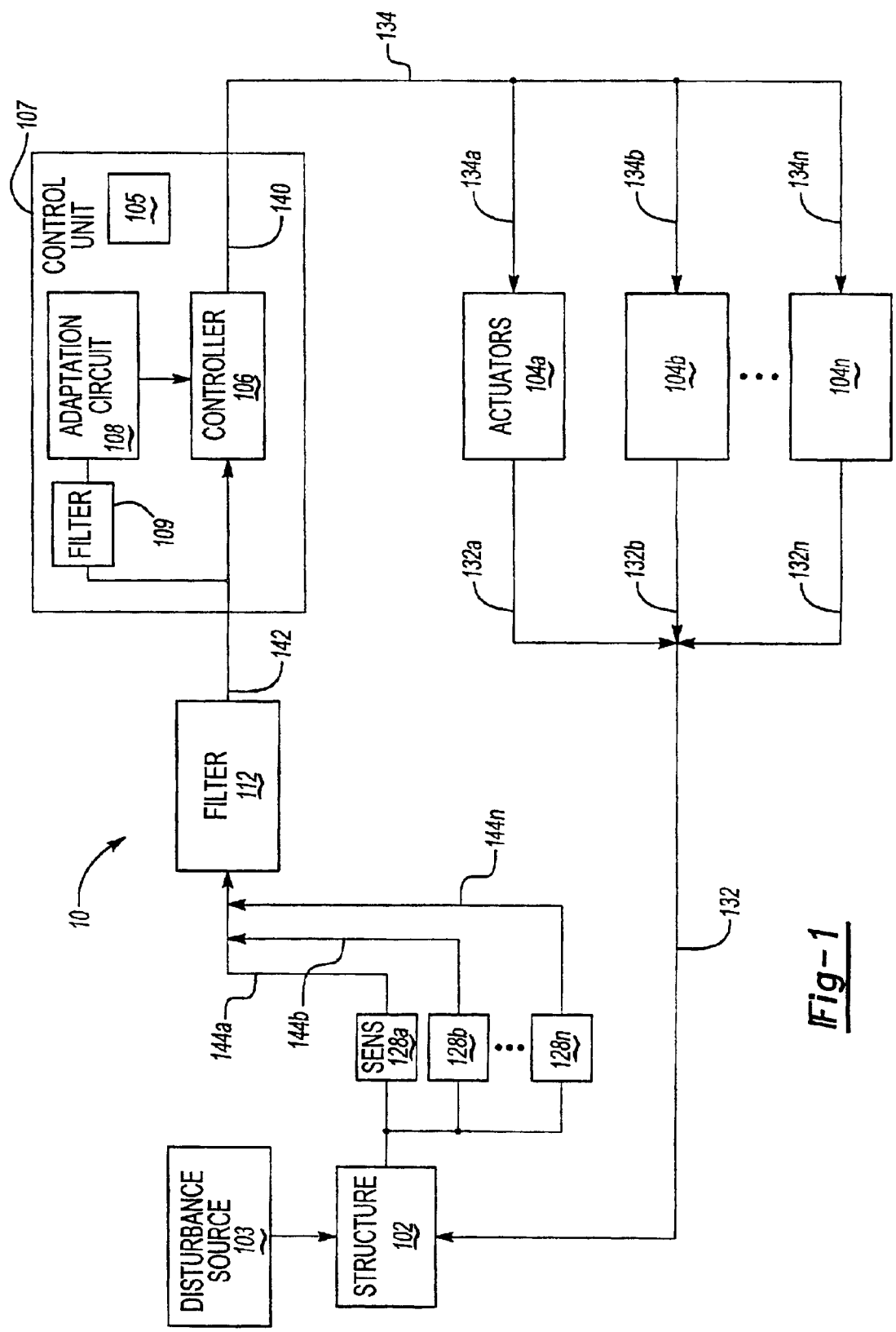
FIG. 1 shows a block diagram of the noise or vibration control system of the present invention.

FIG. 1 shows a block diagram 10 of an active control system. The system comprises a structure 102, the response of which is to be controlled, sensors 128, filter 112, control unit 107 and actuators (which could be force generators) 104. A disturbance source 103 produces undesired response of the structure 102. In a helicopter, for example, the undesired disturbances are typically due to vibratory aerodynamic loading of rotor blades, gear clash, or other source of vibrational noise. A plurality of sensors 128(a) . . . (n) (where n is any suitable number) measure the ambient variables of interest (e.g. sound or vibration). The sensors (generally 128) are typically microphones or accelerometers, or virtually any suitable sensors. Sensors 128 generate an electrical signal that corresponds to sensed sound or vibration. The electrical signals are transmitted to filter 112 via an associated interconnector 144(a). . . (n)

(generally 144). Interconnector 144 is typically wires or wireless transmission means, as known to those skilled in the art.

Filter 112 receives the sensed vibration signals from sensors 128 and performs filtering on the signals, eliminating information that is not relevant to vibration or sound control. The output from the filter 112 is transmitted to control unit 107, which includes adaptation circuit 108 and controller 106, via interconnector 142. In the present invention, a filter 109 is placed before adaptation circuit 108, as will be described below. The controller 106 generates control signals that control force generators 104(a) . . . (n).

A plurality of actuators 104(a) . . . (n) (where n is any suitable number) are used to generate a force capable of affecting the sensed variables (e.g. by producing sound or vibration). Force generators 104(a) . . . (n) (generally 104) are typically speakers, shakers, or virtually any suitable actuators. Actuators 104 receive commands from the controller 106 via interconnector 134 and output a force, as shown by lines 132(a) . . . (n) to compensate for the sensed vibration or sound produced by vibration or sound source 103.

The control unit 107 is typically a processing module, such as a microprocessor. Control unit 107 stores control algorithms in memory 105, or other suitable memory location. Memory 105 is, for example, RAM, ROM, DVD, CD, a hard drive, or other electronic, optical, magnetic, or any other computer readable medium onto which is stored the control algorithms described herein. The control algorithms are the scheme by which the decisions are made as to what commands to the actuators 104 are appropriate, including those conceptually performed by the controller 107 and adaptation circuit 108. Generally, the mathematical operations described in the Background, as modified as described below, are stored in memory 105 and performed by the control unit 107. One of ordinary skill in the art would be able to suitably program the control unit 107 to perform the algorithms described herein. The output of the adaptation circuit 108 may be filtered before being sent to the controller 107.

The present invention improves the quality of the adaptation estimates by adaptation circuit 108 by filtering the input signals to the adaptation circuit, selectively implementing a "dead-zone" during which adaptation does not occur and by selectively adding a dither signal to the control commands.

The filtering, dead zone and dither can be used independently; however, dead zone is beneficial to overcome the drift behavior and dither is beneficial to maintain good performance while using dead zone.

Dead zone

One way to avoid the aforementioned loss of identifiability during steady-state conditions is to actively interrogate the system to determine if the operating conditions are fairly steady and if so turn adaptation off, and only turn it back on again when the system is no longer in a steady-state condition. This approach is usually referred to as establishing a "dead-zone" in which adaptation does not occur. Usually, this dead-zone is established based on examining the magnitude of changes in the sensor signals from one iteration to the next, and if they are smaller than some predefined level, turning adaptation off, and if above that level, turning adaptation on. In the present invention, the dead-zone is based instead on the magnitude of the changes in the control commands, which are responding to the changes in the sensor signals. The variable $\Delta u$ provides a good estimate of whether there are any significant changes that require adaptation to be turned on. Any change in the system T matrix will result in changes in $\Delta u$. The use of $\|\Delta u\|$ as the dead-zone switch is motivated by the fact that there is some minimum value of $\|\Delta u\|$ required for each channel to achieve a good signal-to-noise ratio.

The dead-zone can be applied to all actuators simultaneously, or can be applied to the adaptation of each actuator channel independently (i.e. to each column of the T matrix independently). With the former, then every element of the diagonal matrix Q is equal and set according to $q=q_0$ if $\|\Delta u\| > \Delta_z$ and $q=0$ otherwise, where $\Delta_z$ is the dead-zone threshold. If the dead-zone is instead applied to each channel, then each element of the diagonal matrix Q is either zero if the corresponding $|\Delta u_i| < \Delta_z$, or set equal to $q_0$ otherwise. Setting $Q(i)=0$ turns adaptation off for channel i, and setting it to some positive number greater than zero turns adaptation on. Performing the dead-zone comparison on an actuator channel-by-channel basis is preferable.

Rather than switching adaptation only between on and off, the adaptation gain can be any function of $|\Delta u|$ that is small for small $|\Delta u|$, some constant for large $|\Delta u|$, and goes through some transition in between. For example, setting $q=\min(q_0, q_v|\Delta u|^N)$ has been tested, where N is an integer typically between 2 and 6. Again, this can be set independently for each actuator channel, or the absolute value can be replaced by a norm of the overall vector and the adaptation gain set equal for all channels.

A further refinement of this approach is to actively adjust or recalculate the dead-zone threshold for each actuator channel based on the current noise floor and actuator 104 effectiveness. The dead-zone threshold for each channel is obtained by slowly filtering the dead-zone parameter $|\Delta u_i|$ and multiplying the result by a scale factor typically between 2 and 3. The filter time constant can be 100 times larger than the adaptation time constant.

Dither

The second aspect of this invention is to ensure that the adaptation algorithm has sufficient information to accurately identify the system. To maintain identifiability, a "dither signal" is added to the control commands to, in essence, "ping" the system to increase the amount of information available to the adaptive algorithm. Although it is known to add a dither signal to this type of system, there are several unique aspects of the dither signal implementation in the present invention.

First, the dither signal is implemented on only one actuator channel at a time. Because only a single channel is dithered, then a larger amplitude can be used without degrading overall performance significantly, and hence a larger signal-to-noise ratio is obtained. All of the information coherent with the injected dither signal can be associated with the dithered actuator 104 channel.

The channel being dithered is removed from the control update calculation with a high control weighting, while being the only channel included in the adaptation update calculation. This modification decouples the control and adaptation behavior so that the adaptation recovers its ideal open-loop behavior, and avoids any possibility of drift. Furthermore, any sensor information resulting from the dither will not corrupt the system transfer function estimates for any of the other actuators. The system looks at the response of the sensors 128 taking into account the fact that the actuators 104, other than the dithered actuator, have compensated for the dither signal added to the dithered actuator.

Triangular dither is implemented such that the control amplitude of the channel being dithered is ramped down and then ramped back up to its initial value in a predetermined number of steps. The motivation for ramping the control amplitude down first and then back up to its original value is that in the case where the dithered channel is up against the saturation limit (maximum allowable actuator command) before the application of dither, then the dither will bring the actuator 104 down off this limit. Alternatively, if the dither were implemented first as a ramp up in amplitude followed by a ramp down, then in the case of saturation, control limiting (i.e., signal clipping) would prevent the dither from being implemented since the actuator 104 would be up against the saturation limit throughout the entire dither cycle. Other types of dither signal are possible; however, the ramp maximizes the variable $\Delta u$ which is used by the adaptation algorithm.

The dither amplitude for each channel is set to be proportional to the current control amplitude. This is desirable because not all actuators have equal authority. An actuator 104 with higher authority requires lower control amplitude to achieve the same output or signal to noise ratio. Using this improvement will therefore result in a lower dither amplitude for such an actuator, which, due to the higher authority, will result in similar signal-to-noise for all actuators. Without this modification, a fixed dither amplitude for every actuator 104 would require that a large amplitude be used for sufficient signal-to-noise on the lower authority actuators, which would then yield significant performance degradation of the control system while dithering the higher authority actuators. An additional benefit of a proportional dither signal is to provide more information in highly uncertain directions. If some information in the estimate of the T matrix has more error than other information, this will tend to result in larger than necessary amplitudes on the control signals corresponding to the bad information. As a result, the dither amplitude will increase for these control signals, providing more information to correct the poorer T matrix estimates. If the estimate of the T matrix is known to be poor, for example when the active control system is first activated, then a more rapid adaptation convergence can be obtained by temporarily increasing the dither amplitude and/or the adaptation gain.

This invention will also improve the quality of the adaptation estimates by filtering the input signals to the adaptation circuit 108, $y_k = \Delta z_k$, and $v_k = \Delta u_k$ with filter 109. The presence of background noise not only results in parameter drift, but results in both a bias and a random error in the elements of the T matrix estimate. Improving the quality of the estimate improves the achievable performance of the control algorithm. Alternately, the same quality estimate can be achieved, and the invention can be used to allow lower amplitude dither signals to obtain similar adaptation performance, and lower degradation in overall performance due to the dither.

Introducing a matching first-order low-pass filter on the signal $v_k$ corrects for the bias effect caused by the adaptation responding to noise which has been filtered through the harmonic estimator. This matching filter must have the same corner frequency as the harmonic estimator filter. The result is improved signal to noise due to lower emphasis on high frequency noise, and eliminating bias in the estimate.

The adaptation algorithm described in the background uses the difference in z and u between samples, $\Delta z = z_k - z_{k-1}$ and $\Delta u = u_k - u_{k-1}$, in order to avoid variations in the ambient near zero frequency from distorting the transfer function estimate. This differencing amplifies higher frequency content in u and z. The combination of this with the harmonic estimator filter on z and its matching filter on u results in all information at frequencies above the harmonic estimator corner frequency being treated with equal importance, and information below this frequency being treated with lower importance. Since the information at higher frequencies is predominantly noise rather than useful information, including additional low-pass filtering on both the signals $v_k$ and $y_k$ will improve signal to noise ratio, and improve the quality of the T-matrix estimate (or conversely, allow the same quality of estimate with a lower amplitude dither signal, and hence improve overall algorithm noise reduction performance.) This low-pass filtering can be implemented either as a separate step, or by changing the difference definition of $v_k$ and $y_k$ to a high-pass filter. The result of the combination of filters is to put the most emphasis on the information at the frequencies around the filter corner frequencies, and less emphasis on the information at lower and higher frequencies.

A further modification of the above filtering could improve adaptation performance by using a separate set of filters on the information generated by control transients, and the information generated by the dither signal. The filter characteristics can then be optimized for the known frequency domain characteristics of each of the two types of control inputs $u_k$, in order to maximize the signal to noise ratio for each.

A final modification to the above concept could be useful in systems with small numbers of actuators. The dither algorithm contained in this invention uses time separation to distinguish between the information on one actuator 104 and the information on another, and this is appropriate if there are many actuators. If there are very few actuators, then frequency separation could be used instead. That is, one could put a continuous, small amplitude dither signal on each actuator command, with a different frequency for each actuator. Second-order resonant filters on both $v_k$ and $y_k$ could then be used to extract the distinct information corresponding to each frequency.

Figure 2:
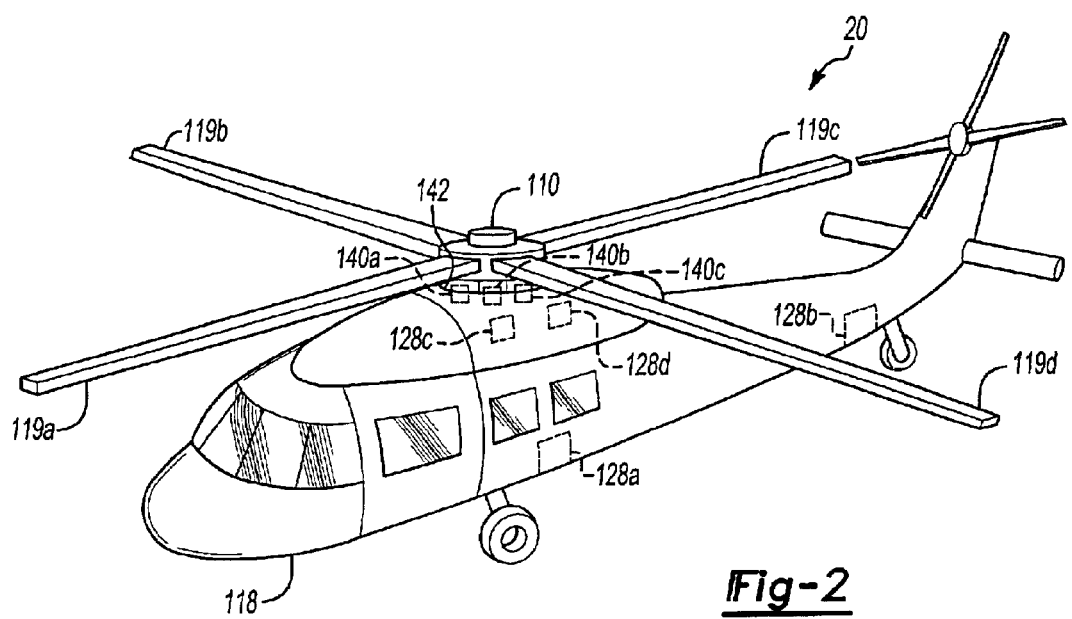
FIG. 2 shows a vehicle in which the present invention may be used.

FIG. 2 shows a perspective view 20 of a vehicle 118 in which the present invention can be used. Vehicle 118, which is typically a helicopter, has rotor blades 119(a) . . . (d). Gearbox housing 110 is mounted at an upper portion of vehicle 118. Gearbox mounting feet 140(a) . . . (c) (generally 140) provide a mechanism for affixing gearbox housing 110 to vehicle airframe 142. Sensors 128(a) through (d) (generally 128) are used to sense acoustic vibration produced by the vehicle, which can be from the rotorblades 119 or the gearbox housing 110. Although only four sensors are shown, there are typically any suitable number of sensors necessary to provide sufficient feedback to the controller (not shown). The sensors 128 may be mounted in the vehicle cabin, on the gearbox mounting feet 140, or to the airframe 142, or to another location on the vehicle 118 that enables vehicle vibrations or acoustic noise to be sensed. Sensors 128 are typically microphones, accelerometers or other sensing devices that are capable of sensing vibration produced by gear clash from the gearbox 110 and generating a signal as a function of the sensed vibration. These sensors generate electrical signals (voltages) that are proportional to the local noise or vibration.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

Alphanumeric identifiers for steps in the method claims are for ease of reference by dependent claims, and do not indicate a required sequence, unless otherwise indicated.

What is claimed is:

1. A method for reducing sensed physical variables including the steps of:
   a) generating a plurality of control commands as a function of the sensed physical variables based upon an estimate of a relationship between the sensed physical variables and the control commands;
   b) updating the estimate of the relationship based upon a response by the sensed physical variables; and
   c) varying a size of the update to the estimate in said step b) based upon a magnitude of change over time by at least one of the plurality of control commands, wherein the estimate of the change in response $y=\Delta z$ due to a chance in control command $v=\Delta u$ at a specific time $t_k$ is denoted $T_k$,
   where $T_k$ is updated according to the equations $$T_{k+1}=T_k+EK^T$$

$$E=y-T_kv$$

$$K=Qv/(1+v^TQv),$$

the matrix Q is a diagonal matrix with elements $q_i$, and the variables $q_i$ determine the adaptation gain corresponding to the $i^{th}$ control command.

2. The method of claim 1 further including the step of selecting between updating or leaving unchanged the estimate of the relationship based upon a magnitude of change by the plurality of control commands.

3. The method of claim 1 further including the step of:
   d) selecting between updating or leaving unchanged the estimate corresponding to a first control command of the plurality of control commands based upon the magnitude of the change in the first control command.

4. The method of claim 3 further including the steps of comparing the magnitude of the change to a threshold and varying the threshold based upon an estimate of a signal to noise ratio.

5. The method of claim 1 wherein:
   a) each variable $q_i$ at each time step is set equal to zero or to some nominal value depending on whether $|v_i|>\delta_i$ where $|v_i|$ is a magnitude of change in the $i^{th}$ control command and the variables $\delta_i$ are the deadzone threshold for channel i.

6. The method of claim 1 wherein:
   each variable $q_i$ at each time step us set according to the equation $q_i=\max(q_o, q_v|v_i|^N)$ where $q_o$ and $q_v$ are parameters chosen for a particular application, $|v_i|$ is a magnitude of change in the $i^{th}$ control command and N is a positive integer.

7. The method of claim 1 wherein the estimate of the relationship is given by $\Delta z=T\Delta u$, where $\Delta z$ is a change in the sensed physical variables and $\Delta u$ is a change in the control commands.

8. A method for reducing sensed physical variables including the steps of:
   a) generating a plurality of control commands as a function of the sensed physical variables based upon an estimate of a relationship between the sensed physical variables and the control commands;
   b) updating the estimate of the relationship based upon a response by the sensed physical variables;
   c) where the control commands are filtered to match a filter that has been applied to the sensed physical variables to improve the quality of the estimates prior to said step b); and
   wherein a change in the sensed physical variables $\Delta z$ is related to a change in the control commands $\Delta u$ by $\Delta z=T(\Delta u)$, the estimate of a sensed physical variable response T is based on $\Delta u$ and $\Delta z$, said method further including the step of filtering $\Delta u$ to match a known filter on $\Delta z$.

9. The method of claim 8 further including the step of low-pass filtering both $\Delta u$ and $\Delta z$ to reduce an impact of high-frequency noise on the estimate of T.

10. A system for controlling a plurality of sensed physical variable comprising:
   a plurality of sensors for measuring the physical variables;
   a control unit generating an estimate of a relationship between the sensed physical variables and a plurality of control commands, and generating the plurality of control commands over time based upon the sensed physical variables and based upon the relationship; and
   a plurality of force generators activated based upon said plurality of command signals;
   wherein the control unit sequentially adds a signal to each of the plurality of control commands, measures the response to the signal and updates the estimate of the relationship based upon the response, wherein the signal added by the control unit is a dither signal that initially decreases in order to avoid saturation for that control command.

11. The system of claim 10 wherein the signal added to each of the plurality of control commands by the control unit differs for each control command.

12. The system of claim 11 wherein the signal added to a given control command includes a triangular signal.

13. The system of claim 10 wherein the control unit holds constant the control command to which the signal is added and updates the control commands other than the one to which the signal is added according to the relationship.

14. The system of claim 13 wherein the control unit updates the relationship only for the control command to which the signal is added.

15. The system of claim 10 wherein the control unit determines a magnitude of the signal based upon a current magnitude of the control command to which the signal is added.

16. The system of claim 10 wherein the control unit varies a frequency of the signal to be added to each of the plurality of control commands and extracts the information corresponding to each said control command.

17. A system for controlling a plurality of sensed physical variable comprising:
   a plurality of sensors for measuring the physical variables;
   a control unit generating an estimate of a relationship between the sensed physical variables and a plurality of control commands, and generating the plurality of control commands over time based upon the sensed physical variables, and based upon the relationship; and
   a plurality of force generators activated based upon said plurality of command signals;
   wherein the control unit varies a size of the update to the estimate of the relationship based upon a magnitude of change over time by at least one of the plurality of control command and wherein the control unit selects between updating or leaving unchanged the estimate of the relationship based upon a magnitude of change by the plurality of control commands.

18. The system of claim 17 wherein the control unit compares the magnitude of the change to a threshold and varies the threshold based upon an estimate of a signal to noise ratio.

19. The system of claim 18 wherein the estimate of the change in response $y=\Delta z$ due to a change in control command $v=\Delta u$ at a specific time $t_k$ is denoted $T_k$, where $T_k$ is updated according to the equations $$T_{k+1}=T_k+EK^T$$

$$E=y-T_k v$$

$$K=Qv/(1+v^T Qv),$$

the matrix Q is a diagonal matrix with elements $q_i$, and the variables $q_i$ determine the adaptation gain corresponding to the $i^{th}$ control command.

20. The system of claim 19 wherein the control unit sets each variable $q_i$ to zero or some nominal value at each time step depending on whether $|v_i|>\delta_i$ where $|v_i|$ is a magnitude of change in the $i^{th}$ control command and the variables $\delta_i$ are a deadzone threshold for channel i.

21. A method for reducing sensed physical variables including the steps of:

a) generating a plurality of control commands as a function of the sensed physical variables based upon an estimate of a relationship between the sensed physical variables and the control commands;

b) updating the estimate of the relationship based upon a response by the sensed physical variables; and c) varying a size of the update to the estimate in said step b) based upon a magnitude of change over time by at least one of the plurality of control commands, wherein the estimate of the relationship is given by $\Delta z=T\Delta u$, where $\Delta z$ is a change in the sensed physical variables and $\Delta u$ is a change in the control commands, and wherein the size of the update is varied in said step c) based upon a comparison of $\|\Delta u\|$ to a threshold.

22. The method of claim 21 further including the step of selecting between updating or leaving unchanged the estimate of the relationship based upon the comparison of $\|\Delta u\|$ to a threshold.

* * * * *

UNITED STATES PATENT AND TRADEMARK OFFICE
CERTIFICATE OF CORRECTION

PATENT NO.     : 6,772,074 B2
DATED          : August 3, 2004
INVENTOR(S)    : Millott et al.

It is certified that error appears in the above-identified patent and that said Letters Patent is hereby corrected as shown below:

Column 9,
Line 18, "chance" should be -- change --.
Line 44, delete "a)".
Line 50, "us" should be -- is --.

Signed and Sealed this

Fourteenth Day of December, 2004

JON W. DUDAS
*Director of the United States Patent and Trademark Office*